Jan. 15, 1952     A. RAPPL     2,582,394
VEHICLE DOOR PANEL STRUCTURE
Filed Oct. 28, 1948
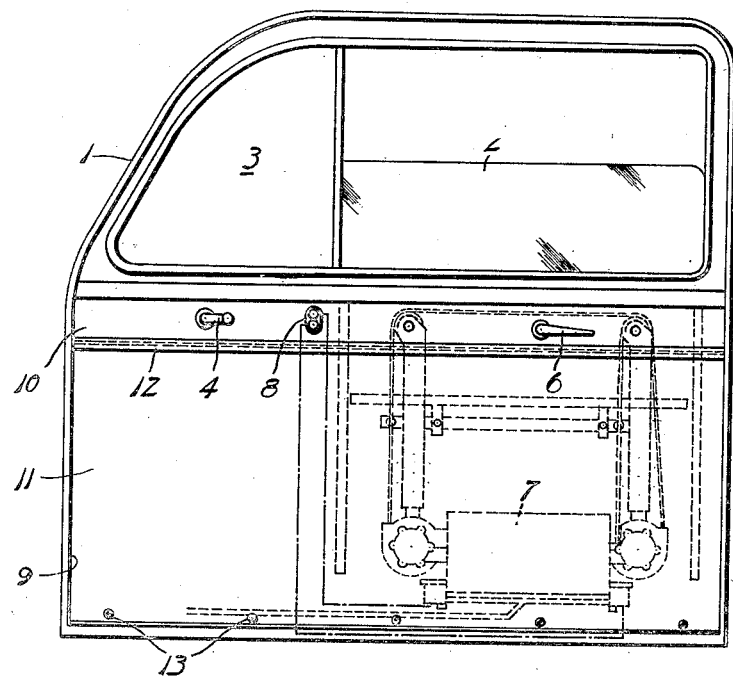
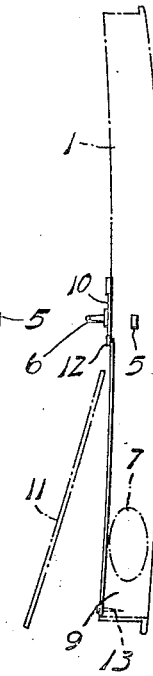
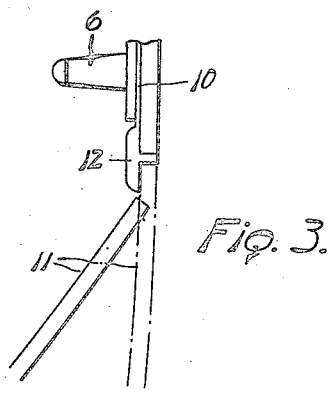
INVENTOR
*Anton Rappl*
BY
*Bean, Brooks, Buckley & Bean.*
ATTORNEYS Patented Jan. 15, 1952

2,582,394

UNITED STATES PATENT OFFICE 2,582,394

VEHICLE DOOR PANEL STRUCTURE

Anton Rappl, Eggertsville, N. Y., assignor to Trico Products Corporation, Buffalo, N. Y.

Application October 28, 1948, Serial No. 56,958

1 Claim. (Cl. 296—44)

This invention relates to the motor vehicle art and has particular reference to the body construction. It has recently been proposed to provide power units for the automatic opening and closing of the windows of automobiles which has necessitated the provision of controls for the automatic mechanism, and when the mechanism is placed in the wall structure, such as the side door, it becomes necessary to remove the manual controls for the window as well as for the door in order to gain access to the wall compartment in which the power unit is arranged.

An object of the present invention is to provide a wall or door structure in which the mounting access is more readily gained to the wall compartment for mounting and repairing the power unit when occasion demands.

A further object of the invention is to provide an interior paneling for the wall or door structure which will be practical in design and arrangement and one by which access may be gained to the power unit compartment without necessitating the disturbance of the several controls on the door.

The foregoing and other objects will manifest themselves as the following description progresses, reference being had to the accompanying drawing, wherein:

Fig. 1 is an interior plan view of a vehicle door construction in accordance with the present invention;

Fig. 2 is an edge elevation thereof in phantom, and;

Fig. 3 is an enlarged detailed view showing more clearly the manner of fitting the removable panel section.

Referring more particularly to the drawing, the numeral 1 designates the side door of an automobile having a vertical slidable window 2 and an angularly adjustable window 3, the latter being regulatable through suitable gearing from a hand cranked control 4. The door handle for releasing the latch 5 is indicated at 6. The panel 2 is vertically adjustable by means of a power unit generally indicated at 7 and which may be of any suitable construction, such as that shown in my earlier Patent 2,432,799. Such power unit has a suitable control designated generally by the numeral 8 for effecting opening and closing movement of the window as imparted by the power unit.

The door latch mechanism, the gearing for the ventilating window 3, and the tower unit are all arranged within the hollow interior of the vehicle door which provides in effect an accessory compartment generally indicated at 9.

The paneling for finishing the interior of the vehicle comprises a fixed section 10 and a removable section 11. The fixed section is relatively narrow and affords a well defined space in which the various controls 4, 6 and 8 are located. The removable panel is relatively larger in order to afford sufficient room and clearance for mounting the power unit 7. The upper edge of the removable panel substantially abuts the lower edge of the fixed panel and the two panel sections are secured together by an overlying bead 12. This bead may be a permanent part of the fixed section 10 and positioned to overhang the lower edge of the fixed panel beneath which the upper edge of the removable panel is slidably engaged, as shown more clearly in Fig. 3. Upon placement of the removable panel, suitable fasteners 13 may be employed to secure the lower edge thereof to the door frame.

By reason of the present construction, the accessory controls are grouped upon a fixed panel which is of narrow expanse. This enables a much larger dimension for the removable panel and affords ample opening to the compartment 9 to facilitate the placement of the power unit and to repair or replace the same. To gain access to the power unit it is only necessary for the garage mechanic to remove the fasterners 13 and displace the removable panel 11. It is, therefore, evident that the installation of the power unit is facilitated since the various controls on the door remain undisturbed.

While the foregoing description has been given in detail it is without though of limitation since the inventive principles involved are capable of assuming other physical embodiments without departing from the spirit of the invention or the scope of the appended claim.

What is claimed is:

In a motor vehicle, a door having a window and an underlying accessory compartment, a closure for the compartment constituting the interior finishing panel of the door, said closure comprising a fixed upper panel and a removable lower panel, the upper margin of the removable panel being engaged beneath an overhanging lower margin of the fixed panel to secure it in place, a door handle mounted on the fixed panel, window operating mechanism arranged in the compartment opposite the removable panel for ready access upon panel removal and having control means located on the fixed panel, a control for the window operating mechanism arranged on the fixed panel, and means for securing the lower margin of the removable panel in position and additionally acting to hold the removable panel engaged beneath the fixed panel.

ANTON RAPPL.

REFERENCES CITED

The following references are of record in the file of this patent:

UNITED STATES PATENTS

| Number | Name | Date |
|---|---|---|
| 1,643,395 | Smith | Sept. 27, 1927 |
| 2,099,248 | Widman | Nov. 16, 1937 |
| 2,103,177 | Randall | Dec. 21, 1937 |
| 2,432,799 | Rappl | Dec. 16, 1947 |
| 2,438,185 | Prance | Mar. 23, 1948 |